United States Patent Office 2,719,182
Patented Sept. 27, 1955

2,719,182

DIELECTRIC COMPOSITIONS

Sidney D. Ross and William M. Allison, Williamstown, Mass., assignors to Sprague Electric Company, North Adams, Mass., a corporation of Massachusetts No Drawing. Application December 28, 1951,
Serial No. 263,958

2 Claims. (Cl. 260—666.5)

This invention relates to new and improved dielectric compositions and more specifically refers to dielectric compositions having exceptional stability in electrical capacitors operated at elevated temperatures and voltage.

A number of dielectric impregnants for capacitors have been developed in recent years to permit operation of the capacitors over wide temperature ranges with high insulation resistance, low electrical loss and other desirable characteristics.

Among such dielectric compositions are those comprising polymers of olefins particularly isobutylene and copolymers of such materials with minor amounts of dienes and other polymerizable materials. Liquid polymers of this type are ordinarily linear in nature and may possess a relatively low percentage unsaturation. Other normally viscous dielectric compositions are low polymers of alpha methyl styrene, and other styrene derivatives. These dielectric compositions possess a particular advantage in that they are synthetic and can be produced under controlled conditions from known starting materials.

Unfortunately, however, the use of these compositions as dielectric impregnants for electrical capacitors employing paper spacers for example is subject to certain limitations. Major among these is the deterioration of the composite dielectric at temperatures of 85° C. to 125° C. and higher. While some of this deterioration may be attributed to the solid spacer (such as cellulose paper) it is known that deterioration of the polymerized dielectric will occur.

It is an object of the present invention to overcome the foregoing and related disadvantages. A further object is to produce new and useful stable dielectric compositions. A further object is to produce electrical capacitors which may be operated at elevated temperatures for extended periods of time without deterioration. Additional objects will become apparent from the following description and claims.

These objects are attained in accordance with the present invention wherein there is produced a dielectric composition consisting of predominant amounts of a liquid synthetic polymer of compounds conforming to the general formula

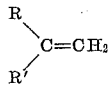

wherein R is an aliphatic or aromatic radical and R' is an aliphatic or aromatic radical or hydrogen, and minor amounts of a compound which inhibits depolymerization of the polymer chain.

In a more restricted sense the invention is concerned with a dielectric composition comprising a predominant amount of substantially linear liquid polymer of compounds conforming to the general formula

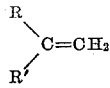

where R is an aliphatic or aromatic radical and R' is an aliphatic or aromatic radical or hydrogen, and minor amounts of a compound which inhibits depolymerization of the vinyl polymer chains.

In one of its limited embodiments this invention is concerned with a dielectric composition comprising a major amount of a liquid polymer predominating in isobutylene and possessing an iodine number between about 25 and 65 with a minor amount of benzil.

The dielectric compositions which are modified in accordance with our invention are synthetic polymers made by polymerizing at least one compound conforming to the general formula

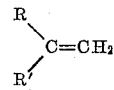

where R is an aliphatic or aromatic radical and R' is an aliphatic or aromatic radical or hydrogen.

Typical monomers employed for this purpose are:

Isobutylene
Styrene
Alphatmethyl styrene
Butadiene-1,3
Hexadiene-1,5
n-Butylene
Propylene
Dimethyl styrene These monomers and mixtures thereof may be polymerized by catalytic means under conditions such as to produce liquid polymers. For example, monomeric mixtures predominating in isobutylene are normally polymerized at temperatures from about —40° to 100° C. using boron trifluoride-water complex as a catalyst. Alpha methyl styrene polymers may be produced by vigorous acid polymerization using oxalic acid as the catalyst. Styrene itself may also be polymerized under conditions which lead to the production of a liquid, relatively low molecular weight polymer. The compounds preferably have some unsaturation although in special cases this may be removed by hydrogenation. The iodine number is usually from about 25 to about 65 with liquid polymers whose molecular weight is from about 300 to about 5000. Some polymers, due to the nature of the polymerization reaction, may have lower iodine values.

Hydrogenation will of course reduce the iodine number and compounds so treated may be used with good results when modified in accordance with the present invention. Poly-alphamethyl styrene may be hydrogenated, for example.

While we are not fully aware of the reasons therefore, it appears that the compounds added to the dielectrics to accomplish the stabilization actually perform dual functions. First, they inhibit the further polymerization of the dielectric composition despite the fact that the latter may be unsaturated. Second, and of even greater importance, they prevent depolymerization at elevated temperatures. It appears that rupture of the polymer molecule at any point forms two fragments, each of which can undergo further decomposition by a radical chain process which results eventually in conversion of the entire polymer chain to the monomer fragments from which it was produced. The inhibitors of this invention probably owe their effectiveness to their ability to interrupt this chain process by reacting with the two fragments formed by ruptures of the polymer molecule and neutralizing them to the extent that further depolymerization is prevented. Thus we may term our inhibitors as chain interrupters.

Preferred compounds are the quinones, aromatic nitro compounds, aromatic diketones, such as benzil, and amino aromatics. Also effective are the nitroso substituted aromatics, azo and hydrazo aromatics.

In many cases we prefer to employ a stabilizer possessing at least two active groups and at least one solubilizing group. For example, hydroquinone or anthraquinone are effective per se as stabilizers but not appreciably soluble in many of the dielectric compositions. We therefore prefer to add methyl, ethyl, isopropyl or other aliphatic substituents to the ring to improve the solubility of the stabilizer in the dielectric composition.

The diketone benzil has also been found to be a very effective compound for use in accordance with the present invention. Alkyl substituted derivatives thereof are often desirable for use to improve the solubility in the dielectric composition throughout the operating range. Other preferred compounds are methyl anthraquinone and azobenzene.

It is also desirable that the compound added to the dielectric composition possess dielectric properties sufficiently good to avoid appreciable reduction in the dielectric properties of the composition to be stabilized, as for example, the insulation resistance of the dielectric composition at elevated temperatures.

The quantities of stabilizers employed to prevent deterioration of the dielectric composition normally range from about .1% to about 5%. The preferred range of operation is from about 0.5% to about 2%.

As typical examples of the practice of our invention three sets of paper capacitors were made up. Each of three sets employed three layers of .00025" calendered kraft paper wound to give a capacity upon impregnation of 0.7 mfd. The control series was impregnated with a liquid dielectric composition comprising a substantially linear polymer consisting essentially of isobutylene. The molecular weight was about 3300 and the unsaturation about 35 in terms of iodine number. The second series had 1% benzil added to the viscous oil described above while the third series had 1% azobenzene added thereto. All units were life tested at 600 v. D. C. at a temperature of 125° C. Results were noted for each capacitor in the series (10 of each type) as "hours' life before shorting." The median life was used as a judge of merit of the stabilizers.

The control series gave a median life of 27 hours. The units with azobenzene gave a median life of 67 hours, more than a two-fold increase. The units containing benzil gave a median life of 143 hours, more than a five-fold increase in capacitor life.

It is customary to add the stabilizer to the dielectric composition prior to use of the latter as a dielectric impregnant. However, the dielectric spacer, such as paper, may be treated with the stabilizer prior to winding of the capacitor. This may be done by depositing the stabilizer from solution onto the surface of the spacer. If the spacer is to be lacquer treated it is possible to incorporate the stabilizer in the lacquer if care is exercised to make certain that it is available to dissolve in the impregnant upon impregnation.

It may be possible to employ the compounds used in the present invention as stabilizers as the sole impregnant for paper capacitors at elevated temperatures. That is, the capacitor paper could be treated with the compound as indicated above without subsequent impregnation or the finished capacitor could be impregnated with a stabilizer of the present invention.

The metal electrodes which may be employed for the capacitor structure include lead, zinc, tin, copper, silver and the like as well as alloys of these metals. The electrode may consist of a rolled metal film or as a sprayed or fiber deposited film on the dielectric spacer.

The dielectric spacer may as aforesaid consist of a calendered kraft paper or may consist of other known dielectric materials. Other dielectric spacers include papers and separators made from regenerated cellulose, polyacrylonitrile, fibers made from polyamides, fibers made from polyesters, glass fiber, mica paper and the like. The housing of the capacitor may be of metal or plastic depending upon the size and application for the finished unit.

As many widely different embodiments of this invention may be made without departing from the spirit and scope hereof, it is to be understood that the invention is not limited to the specific embodiments hereof except as defined in the appended claims.

What is claimed is:

1. A dielectric composition consisting essentially of a liquid hydrocarbon polymer of isobutylene possessing a molecular weight between about 300 and 5000, an iodine number between about 25 and about 65, and from about 1/10% to about 5% of benzil.

2. A dielectric composition consisting essentially of polyisobutylene having a molecular weight of about 3300 and an iodine number of about 35 admixed with about 1% benzil.

References Cited in the file of this patent

UNITED STATES PATENTS

| Number | Name | Date |
|---|---|---|
| 1,950,438 | Carothers et al. | Mar. 13, 1934 |
| 2,274,031 | Bannon | Feb. 24, 1942 |
| 2,443,217 | Amos et al. | June 15, 1948 |
| 2,443,974 | Atkinson | June 22, 1948 |